US006744056B1

(12) United States Patent
Ogawa

(10) Patent No.: US 6,744,056 B1
(45) Date of Patent: Jun. 1, 2004

(54) RADIATION IMAGE CONVERSION PANEL AND METHOD OF MANUFACTURING RADIATION IMAGE CONVERSION PANEL

(75) Inventor: Hiroshi Ogawa, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/449,625

(22) Filed: Nov. 30, 1999

(30) Foreign Application Priority Data

Dec. 28, 1998 (JP) .......................................... 10-374292

(51) Int. Cl.[7] ............................................... G03B 42/00
(52) U.S. Cl. .................................................... 250/484.4
(58) Field of Search .......................... 250/484.4; 427/65

(56) References Cited

U.S. PATENT DOCUMENTS

| | | | | | |
|---|---|---|---|---|---|
| 2,681,294 | A | * | 6/1954 | Beguin | 430/523 |
| 3,859,527 | A | | 1/1975 | Luckey | |
| 4,445,458 | A | * | 5/1984 | O'Brien | 118/401 |
| 4,728,583 | A | * | 3/1988 | Yamazaki et al. | 428/690 |
| 5,340,661 | A | * | 8/1994 | Van Havenbergh et al. | 428/690 |
| 5,458,913 | A | * | 10/1995 | Tsunoda et al. | 427/128 |
| 5,877,504 | A | * | 3/1999 | Yanagita et al. | 250/484.4 |

FOREIGN PATENT DOCUMENTS

| | | |
|---|---|---|
| DE | 4025980 | 11/1991 |
| JP | 48-80487 | 10/1973 |
| JP | 48-80489 | 10/1973 |
| JP | 53-39277 | 4/1978 |
| JP | 54-47883 | 4/1979 |
| JP | 55-12142 | 1/1980 |
| JP | 55-12143 | 1/1980 |
| JP | 55-12144 | 1/1980 |
| JP | 55-12145 | 1/1980 |
| JP | 55-843897 | 6/1980 |
| JP | 55-160078 | 12/1980 |
| JP | 56-116777 | 9/1981 |
| JP | 57-23673 | 2/1982 |
| JP | 57-23675 | 2/1982 |
| JP | 58-69281 | 4/1983 |
| JP | 58-206678 | 12/1983 |
| JP | 59-23400 | 2/1984 |
| JP | 59-27980 | 2/1984 |
| JP | 59-38278 | 3/1984 |
| JP | 59-47289 | 3/1984 |
| JP | 59-56479 | 3/1984 |
| JP | 59-56480 | 3/1984 |
| JP | 59-75200 | 4/1984 |
| JP | 59-200200 | 11/1984 |
| JP | 60-84381 | 5/1985 |
| JP | 60-101173 | 6/1985 |
| JP | 62-25189 | 2/1987 |
| JP | 4-44720 | 7/1992 |

* cited by examiner

*Primary Examiner*—Constantine Hannaher
*Assistant Examiner*—Shun Lee
(74) *Attorney, Agent, or Firm*—Sughrue Mion, PLLC

(57) ABSTRACT

A method of manufacturing a radiation image conversion panel, in which a stimulable phosphor-containing coating solution that contains at least a stimulable phosphor and a binder is appiled to a support such that a film thickness of the coated stimulable phosphor-containing coating solution is uniform and is 100 μm or more.

10 Claims, 2 Drawing Sheets

RADIATION IMAGE CONVERSION PANEL AND METHOD OF MANUFACTURING RADIATION IMAGE CONVERSION PANEL

BACKGROUND OF THE INVENTION

1. Field of the Invention

The present invention relates to a method of manufacturing a radiation image conversion panel that can form a stimulable phosphor layer of a uniform thickness on a support by applying to the support a stimulable phosphor-containing coating solution that contains a stimulable phosphor. Further, the present invention relates to a radiation image conversion panel that is obtained by this method of manufacturing a radiation image conversion panel, which is of a uniform film thickness and whose quality and practical value are high.

2. Description of the Related Art

Recently, as a technique to be used in place of radiography, there have been proposed radiation image conversion methods, for example, in Japanese Patent Application Laid-Open (JP-A) No. 55-12145, Japanese Patent Application Publication: (JP-B) No. 4-44720, and the like. Such radiation image conversion methods use a radiation image conversion panel (an accumulative fluorescent sheet) that includes a layer containing a stimulable phosphor. In the methods, radiation that has passed through a subject or radiation that has been emitted from a subject is absorbed by the stimulable phosphor in the panel, and thereafter, the stimulable phosphor is excited in time sequence by an electromagnetic wave (excitation light) that is selected from visible rays and infrared rays, so that the radiation energy accumulated in the stimulable phosphor becomes fluorescent and is discharged. By reading the fluorescent light optically, electronic signals are obtained. Then, the obtained electric signals are made into images. With the above-described radiation image conversion panel, it becomes possible to obtain a radiation image (an image formed by radiation) that, as compared with a case in which the conventional radiography is employed, has a smaller amount of exposure, can be image-processed by a computer, and has a large amount of information.

The above-described radiation image conversion panel can be formed by applying a coating solution that contains a stimulable phosphor onto a support.

Conventionally, various types of application methods for applying a coating solution to a support (web) so as to form a layer have been proposed. However, many of these methods relate to application techniques using coating solutions having low viscosity or to high speed application techniques in which a coating solution is applied at a speed higher than 100 m/min and at a film thickness of less than 100 $\mu$m.

However, the stimulable phosphor-containing coating solution that is used for manufacturing the radiation image conversion panel is a highly viscous coating solution that contains a stimulable phosphor in a high concentration as a solid component. Further, the conventionally known coating techniques described above are incapable of sufficiently coping with cases such as, as with the radiation image conversion panel, the film thickness of the coated film of the stimulable phosphor-containing coating solution that is applied needs to be 100 $\mu$m or more and the stimulable phosphor-containing coating solution needs to be applied at relatively low speed.

As the method of applying the above-mentioned highly viscous stimulable phosphor-containing coating solution to a m support (web), there has been proposed a variety of methods such as the stimulable phosphor-containing coating solution being continuously applied to a support (web) by use of a doctor blade, as described in JP-B No. 4-44720, or the stimulable phosphor-containing coating solution being applied to a support by use of a roll coater, a knife coater, or the like.

The above-described coating methods allow stable coating when used for coating for short lengths of approximately several tens of meters. However, when used for long lengths of approximately from several hundreds to several thousands of meters, there have been problems such as unstable film thickness of the coated film of the stimulable phosphor-containing coating solution, non-uniformity of thickness of the stimulable phosphor layer within the same plane, generation of coating streaks, unstable taking-up of the coated panel due to accumulation of the stimulable phosphor-containing coating solution at the end portions, and the like.

Particularly when used for medical diagnoses, since a variation of density in an image becomes signal data used for a diagnosis, the sensitivity (stimulated emission amount) of the entire stimulable phosphor layer must be extremely uniform, having no dispersion within the same plane. Further, the thickness of the stimulable phosphor layer and the sensitivity (stimulated emission amount) of the entire stimulable phosphor layer are closely related.

Therefore, with the conventional application methods in which the film thickness of the coated film is non-uniform, not only is it not possible to improve productivity, but also, it is difficult to make uniform the film thickness of the entire stimulable phosphor layer that can accumulate radiation energy, in other words, to make the sensitivity (stimulated emission amount) of the entire phosphor surface uniform.

SUMMARY OF THE INVENTION

The present invention aims to solve the aforementioned conventional problems and to attain the following object. Namely, an object of the present invention is to provide a method of manufacturing a radiation image conversion panel with high produceability in which, even when a highly viscous stimulable phosphor-containing coating solution, which contains a stimulable phosphor as a solid component in a high concentration, is applied to a support such that the film thickness is 100 $\mu$m or more, a uniform film thickness on the support is obtained, and to provide a radiation image conversion, panel that is obtained by the method of manufacturing a radiation image conversion panel, which conversion panel has a uniform film thickness and high quality and practical value.

The means for solving the above are as follows:

(1) a method of manufacturing a radiation image conversion panel in which a stimulable phosphor-containing coating solution, which contains at least a stimulable phosphor and a binder, is applied to a support by use of an extrusion coater such that the film thickness of a coated film of the stimulable phosphor-containing coating solution is 100 $\mu$m or more;

(2) a method of manufacturing a radiation image conversion panel according to the (1), wherein the film thickness of the coated film of the stimulable phosphor-containing coating solution is from 200 to 1,000 $\mu$m;

(3) a method of manufacturing a radiation image conversion panel according to the (1) or (2), wherein at least one of the support and the extrusion coater is moved and the speed of the movement is from 0.5 to 50 m/min;

(4) a method of manufacturing a radiation image conversion panel according to one of the (1) through (3), wherein the viscosity of the stimulable phosphor-containing coating solution is from 1 to 10 Pa·s;

(5) a method of manufacturing a radiation image conversion panel according to one of the (1) through (4), wherein the stimulable phosphor-containing coating solution is applied such that a gap A (μm) between a discharge opening at the tip of the extrusion coater and the support, and a film thickness B (μm) of the coated film of the stimulable phosphor-containing coating solution satisfy the following relational expression;

$$0.75\times B+100 \geqq A \geqq 1.10\times B130$$

(6) a method of manufacturing a radiation image conversion panel according to one of the (1) through (5), wherein the extrusion coater is disposed on a surface of a first plane, and the support is disposed on a roller whose axis is located parallel to a direction orthogonal to the direction in which the stimulable phosphor-containing coating solution is discharged in a second plane that is located above the discharge opening at the tip of the extrusion coater and parallel to the first plane, such that an angle formed by, on the one hand, the direction of the shortest distance between the tip discharge opening and the roller and, on the other hand, the second plane is from 0 to 30°;

(7) a method of manufacturing a radiation image conversion panel according to one of the (1) through (6), wherein the extrusion coater is disposed on a surface of a first plane, and the support is disposed on a roller whose axis is located parallel to a direction orthogonal to the direction in which the stimulable phosphor-containing coating solution is discharged in a second plane that is located above the discharge opening at the tip of the extrusion coater and parallel to the first plane, such that an angle formed by the direction in which the stimulable phosphor-containing coating solution is discharged and the second plane is from 5 to 60°;

(8) a radiation image conversion panel obtained by the method of manufacturing a radiation image conversion panel according to one of the (1) through (7).

DETAILED DESCRIPTION OF THE INVENTION

A method of manufacturing a radiation image conversion panel of the present invention includes a step in which a stimulable phosphor-containing coating solution that contains at least a stimulable phosphor and a binder is applied to a support by use of an extrusion coater such that the film thickness of the coated film is 100 μm or more.

Further, the radiation image conversion panel of the present invention comprises at least a stimulable phosphor layer on the support, and comprises other layers, which are selected suitably if desired. The radiation image conversion panel of the present invention is manufactured by the method of manufacturing a radiation image conversion panel of the present invention.

Figure 1:
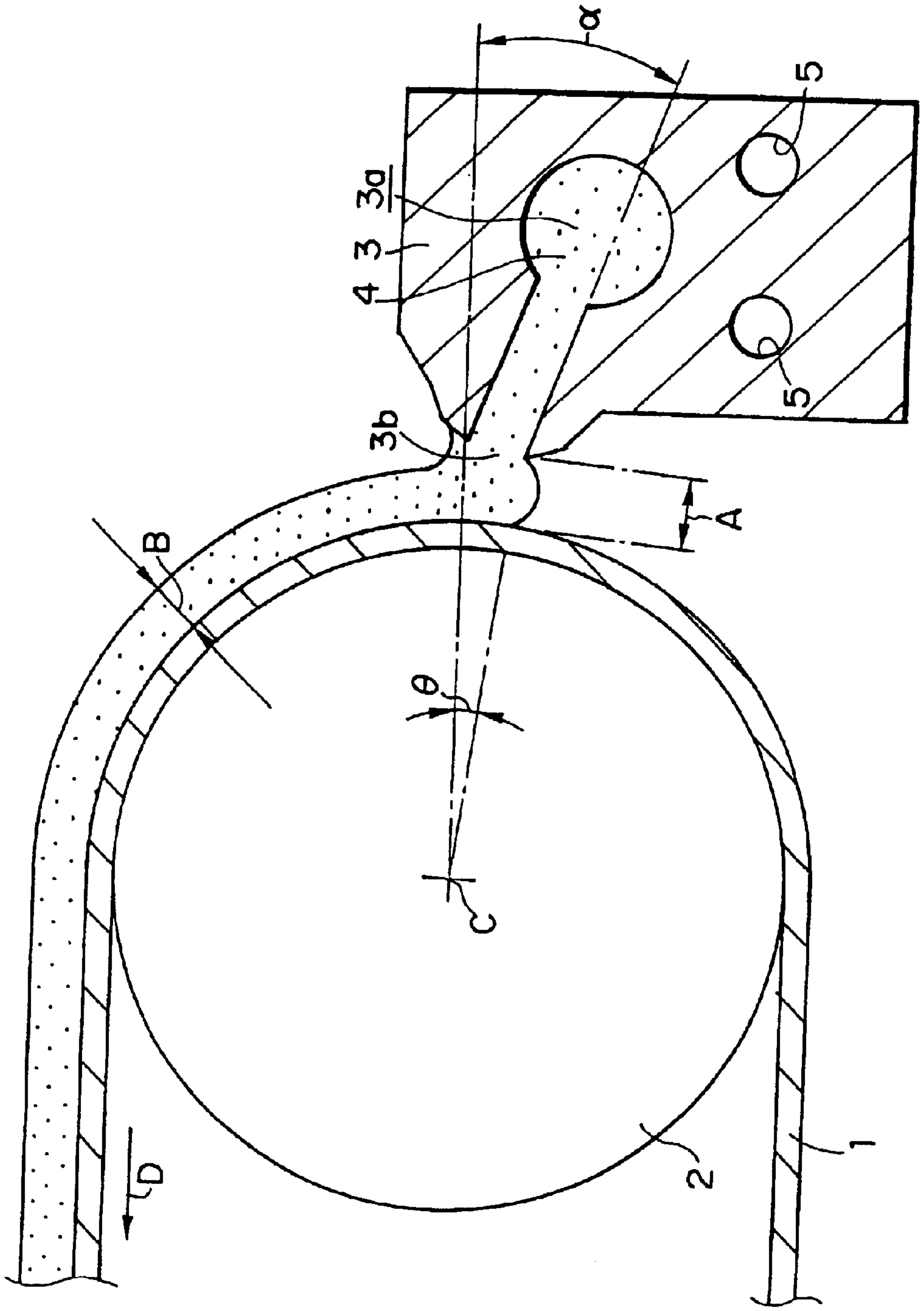
FIG. 1 is a schematic diagram for describing a state in which a stimulable phosphor-containing coating solution is being applied to a support in a method of manufacturing a radiation image conversion panel of the present invention.

Accordingly, hereinafter, the method of manufacturing a radiation image conversion panel of the present invention will be described, and through this description, details of the radiation image conversion panel of the present invention will be made clear. Method of Manufacturing Radiation Image Conversion Panel Application of Stimulable Phosphor-Containing Coating Solution Application of the stimulable phosphor-containing coating solution can be preferably carried out, for example, in the manner shown in FIG. 1. FIG. 1 is a schematic diagram which illustrates a state in which the stimulable phosphor-containing coating solution is being applied to a support in the method of manufacturing a radiation image conversion panel of the present invention.

As shown in FIG. 1, for the application of the stimulable phosphor-containing coating solution, an extrusion coater 3 is used as a coating member. The extrusion coater 3 is not particularly limited, and can be selected suitably from among known apparatuses.

The extrusion coater 3 includes a stimulable phosphor-containing coating solution housing portion 3*a* that houses a stimulable phosphor-containing coating solution 4, and a tip discharge opening 3*b*. When the extrusion coater 3 is started, the stimulable phosphor-containing coating solution 4 is discharged to the exterior of the housing portion 3*a* via the tip discharge opening 3*b*.

The positional relationship between the extrusion coater 3 and the support 1 can be selected suitably depending on the purpose. For example, the support 1 and the extrusion coater 3 may be disposed such that the support 1 is on a flat surface and the tip discharge opening 3*b*of the extrusion coater 3 is located at a position opposing the support 1. In such a case, the stimulable phosphor-containing coating solution 4 can be applied to the surface of the support 1, for example, by fixably disposing one of the extrusion coater 3 and the support 1 and successively moving the other one of the extrusion coater 3 and the support 1 in parallel, and starting the extrusion coater 3.

Further, it is also possible to apply the stimulable phosphor-containing coating solution 4 to the surface of the support 1, by moving the extrusion coater 3 and the support 1, which have been disposed so as to be opposed to each other as described above, parallel to each other (in the same direction or in opposite directions).

In the method of manufacturing a radiation image conversion panel of the present invention, the application of the stimulable phosphor-containing coating solution can be carried out most preferably in the following manner.

Namely, the extrusion coater 3 is disposed on a surface in a first plane, and the support 1 is disposed on a roller 2 whose central axis C is located parallel to a direction that is orthogonal to the direction in which the stimulable phosphor-containing coating solution 4 is discharged in a second plane that is located above the tip discharge opening 3*b* of the extrusion coater 3 and parallel to the first plane.

The roller 2 is not particularly limited as long as it is a support in the shape of a hollow cylinder or a cylinder that has an arbitrarily fixed diameter at a portion at which the support 1 is disposed.

The support 1 is moved at a constant speed together with the roller 2 in the direction indicated by arrow D. As the extrusion coater 3 is started, the stimulable phosphor-containing coating solution 4 that is discharged from the stimulable phosphor-containing coating solution housing portion 3*a* is applied sequentially to the surface of the support 1 at a fixed speed.

A cooling water channel 5 in FIG. 1 passes through the extrusion coater 3. In the cooling water channel 5, cooling water such as well water is circulated so as to keep the extrusion coater 3 and the stimulable phosphor-containing coating solution 4 at fixed temperature.

As the moving speed at which at least one of the extrusion coater 3 and the support 1 is moved, a relative moving speed of 0.5 to 50 m/min is preferable, and 1 to 30 m/min is particularly preferable.

When the relative moving speed is less than 0.5 m/min, produceability may be decreased, and control of the speed may become difficult. On the other hand, when the relative moving speed is more than 0.5 m/min, feeding of the stimulable phosphor-containing coating solution 4 may become difficult.

A film thickness B of the coated film of the stimulable phosphor-containing coating solution 4 that is applied to the support 1 in the manner described above is 100 $\mu$m or more. A thickness of from 200 to 1,000 $\mu$m is preferable and that of from 300 to 800 $\mu$m is particularly preferable.

When the film thickness B of the coated film of the stimulable phosphor-containing coating solution is less than 100 $\mu$m, the sensitivity of the stimulable phosphor layer is weak (the stimulated emission amount is small). Accordingly, such a layer cannot be practically used for medical applications and the like.

It is preferable that the extrusion coater 3 is disposed such that there is a gap A ($\mu$m) between the tip discharge opening 3*b*, from which the stimulable phosphor-containing coating solution 4 is discharged and the support 1. The gap A ($\mu$m) means the shortest distance between the tip discharge opening 3*b*, from which the stimulable phosphor-containing coating solution 4 is discharged, and the support 1. The gap A ($\mu$m) is determined based on its relationship to the film thickness B ($\mu$m) of the coated film of the stimulable phosphor-containing coating solution 4 that is applied to the support 1.

In the present invention, it is preferable that the gap A ($\mu$m) and the film thickness B ($\mu$m) of the coated film satisfy the following relational expression:

$$0.75\times B+100\leqq A\leqq 1.10\times B+130$$

and it is particularly preferable that the gap A ($\mu$m) and the film thickness B ($\mu$m) of the coated film satisfy the following relational expression:

$$0.80\times B+110\leqq A\leqq 1.05\times B+130$$

When the value of the gap A ($\mu$m) between the tip discharge opening 3*b* of the extrusion coater 3 and the support 1 is less than 0.75×B ($\mu$m)+100, coating streaks that cannot be removed may occur, coating non-uniformity in which the difference in the film thickness in the same plane is more than 10 $\mu$m may occur, and taking-up of the coated support 1 cannot be carried out due to the thickened end portions. On the other hand, when the value of the gap A ($\mu$m) between the tip discharge opening 3*b* of the extrusion coater 3 and the support 1 is more than 1.05×B ($\mu$m)+130, the coating fitness of the stimulable phosphor-containing coating solution 4 is inferior, and there is the possibility that the stimulable phosphor-containing coating solution 4 may not entirely spread on the support 1 during coating.

Further, the extrusion coater 3 is disposed on a surface in a first plane. Here, in the positional relationship with the roller 2, the central axis C of the roller 2 is located parallel to a direction that is orthogonal to the direction in which the stimulable phosphor-containing coating solution 4 is discharged in the second plane that is located parallel to the first plane, and as an angle θ formed by, on one hand, the direction of the shortest distance between the tip discharge opening 3*b* and the roller 2, and, on the other hand, the second plane, 0 to 30° is preferable, and 0 to 25° is particularly preferable.

When the angle θ formed by the second plane surface and the direction of the shortest distance between the tip discharge opening 3*b* of the extrusion coater 3 and the roller 2 is greater than 30°, non-uniformity of thickness of the stimulable phosphor layer may easily occur.

An angle α formed by the direction in which the stimulable phosphor-containing coating solution 4 is discharged and the second plane is preferably 5 to 60°, and more preferably 5 to 30°.

If the angle α formed by the direction in which the stimulable phosphor-containing coating solution 4 is discharged and the second plane is less than 5°, it is easy for coating streaks to form at the stimulable phosphor layer, whereas if the angle α is greater than 60°, non-uniformity of thickness of the stimulable phosphor layer may easily occur.

Stimulable Phosphor-Containing Coating Solution

The stimulable phosphor-containing coating solution used in the method of manufacturing a radiation image conversion panel of the present invention is a coating solution that contains at least a stimulable phosphor, a binder and an organic solvent.

As the viscosity of the stimulable phosphor-containing coating solution at ordinary temperature, a viscosity of 1 to 10 Pa·s is preferable, and 2 to 8 Pa·s is particularly preferable.

When the viscosity of the stimulable phosphor-containing coating solution is less than 1 Pa·s, non-uniformity of thickness of the stimulable phosphor layer may easily occur. On the other hand, when the viscosity of the stimulable phosphor-containing coating solution is more than 10 Pa·s, coating at relatively high speed may become difficult.

As described above, the stimulable phosphor-containing coating solution 4 in FIG. 1 can be prepared and maintained at a more constant temperature by means of the cooling water circulating in the cooling water channel 5 provided inside the extrusion coater 3. When the stimulable phosphor-containing coating solution 4 and the extrusion coater 3 are kept at approximately the same temperature, the viscosity of the stimulable phosphor-containing coating solution 4 can be maintained and adjusted to be constant. As a result, a stimulable phosphor layer with an extremely uniform thickness can be formed.

The stimulable phosphor contained in the stimulable phosphor-containing coating solution is a phosphor that has the following properties. When radiation having high energy such as X rays, gamma rays, electron beams or the like is irradiated to the phosphor, the stimulable phosphor can emit light instantaneously (which is called "instantaneous emission"). At the same time, a part of the energy accumulates in the phosphor and the phosphor retains it for a certain period. Then, when a specific electromagnetic wave (excitation light) such as laser light or the like is irradiated again, the phosphor can emit light whose light amount varies in accordance with the amount of the energy that is accumulated in the respective particles of the stimulable phosphor (this is called "stimulated emission").

As the stimulable phosphor, from a practical point of view, it is preferable to use known phosphors that exhibit stimulated emission of light having a wavelength of from 300 to 500 nm due to excitation light of wavelengths of from 400 to 900 nm.

Examples of the stimulable phosphor include $BaSO_4$:AX described in Japanese Patent Application Laid-Open (JP-A) No. 48-80487; a phosphor that is represented by $SrSO_4$ and described in Japanese Patent Application Laid-Open (JP-A) No. 48-80489; $Li_2B_4O_7$:Cu, Ag described in Japanese Patent Application Laid-Open (JP-A) No. 53-39277; $Li_2O\cdot(B_2O_2)$x:Cu and $Li_2O\cdot(B_2O_2)$x: Cu, Ag described in Japanese Patent Application Laid-Open (JP-A) No. 54-47883; SrS:Ce, Sm, SrS:Eu, Sm, $ThO_2$:Er and $La_2O_2S$: Eu, Sm described in U.S. Pat. No. 3,859,527; ZnS:Cu, Pb, $BaO\cdot xAl_2O_3$:Eu (wherein $0.8 \leqq x \leqq 10$) and $M^{II}O\cdot xSiO_2$:A (wherein $M^{II}$ is Mg, Ca, Sr, Zn, Cd or Ba; A is Ce, Tb, Eu, Tm, Pb, Tl, Bi or Mn; and x is $0.5 \leqq x \leqq 2.5$) that are described in Japanese Patent Application Laid-Open (JP-A) 55-12142; and the like.

Further, examples of the stimulable phosphor include $(Ba_{1-x-y}$, MgX, Cay)FX:$aEu^{2+}$ (wherein X is at least one of Cl and Br, x and y satisfy $0<x+y \leqq 0.6$ and $xy \neq 0$, and a satisfies $10^{-6} \leqq a \leqq 5\times10^{-2}$) described in Japanese Patent Application Laid-Open. (JP-A) No. 55-12143; LnOX:xA (wherein Ln is at least one element selected from the group consisting of La, Y, Gd and Lu, X is at least one element selected from Cl and Br, A is at least one element selected from Ce and Th, and x satisfies $0<x<0.1$) described in Japanese Patent Application Laid-Open (JP-A) No. 55-12144, $(Ba_{1-x}, M^{2+}X)$FX:yA (wherein $M^{2+}$ is at least one element selected from the group consisting of Mg, Ca, Sr, Zn and Cd, X is at least one element selected from the group consisting of Cl, Br and I, A is at least one element selected from the group consisting of Eu, Tb, Ce, Tm, Dy, Pr, Ho, Nd, Yb and Er, x satisfies $0 \leqq x \leqq 0.6$ and y satisfies $0 \leqq y \leqq 0.2$); and the like.

In addition, examples of the stimulable phosphor include the phosphor that is represented by BaFX:xCe·yA and described in Japanese Patent Application Laid-Open (JP-A) No. 55-843897; the phosphor described in Japanese Patent Application Laid-Open (JP-A) No. 55-160078, which is represented by the composition formula $M^{II}FX\cdot xA$:yLn (wherein $M^{II}$I is at least one element selected from the group consisting of Ba, Ca, Sr, Mg, Zn and Cd, A is at least one compound selected from the group consisting of BeO, MgO, CaO, SrO, BaO, ZnO, $Al_2O_3$, $Y_2O_3$, $La_2O_3$, $In_2O_3$, $SiO_2$, $TiO_2$, $ZrO_2$, $GeO_2$, $SnO_2$, $Nb_2O_5$, $Ta_2O_5$ and $ThO_2$, Ln is at least one element selected from the group consisting of Eu, Tb, Ce, Tm, Dy, Pr, Ho, Nd, Yb, Er, Sm and Gd, X is at least one element selected from the group consisting of Cl, Br and I, and x and y satisfy $5\times10^{-5} \leqq x \leqq 0.5$ and $0<y \leqq 0.2$, respectively); and the like.

Examples of the stimulable phosphor also include the phosphor described in Japanese Patent Application Laid-Open (JP-A) No. 56-116777, which is represented by the composition formula $(Ba_{1-x}, M^{II}_x)F_2\cdot aBaX_2$: yEu, zA (wherein $M^{II}$ is at least one element selected from the group consisting of beryllium, magnesium, calcium, strontium, zinc and cadmium, X is at least one element selected from the group consisting of chlorine, bromine and iodine, A is at least one element selected from the group consisting of zirconium and scandium, and a, x, y and z satisfy $0.5 \leqq a \leqq 1.25$, $0 \leqq x \leqq 1$, $10^{-6} \leqq y \leqq 2\times10^{-1}$ and $0 \leqq z \leqq 10^{-2}$, respectively); the phosphor described in Japanese Patent Application Laid-Open (JP-A) No. 57-23673, which is represented by the composition formula $(Ba_{1-x}, M^{II}_x)F_2\cdot aBaX_2$:yEu, zB (wherein $M^{II}$ is at least one element selected from the group consisting of beryllium, magnesium, calcium, strontium, zinc and cadmium, X is at least one element selected from the group consisting of chlorine, bromine and iodine, and a, x, y and z satisfy $0.5 \leqq a \leqq 1.25$, $0 \leqq x \leqq 1$, $10^{-6} \leqq y \leqq 2\times10^{-1}$ and $0 \leqq z \leqq 10^{-2}$, respectively); the phosphor described in Japanese Patent Application Laid-Open (JP-A) No. 57-23675, which is represented by the composition formula $(Ba_{1-x}, M^{II}_x)F_2\cdot aBaX_2$:yEu, zB (wherein $M^{II}$ is at least one element selected from the group consisting of beryllium, magnesium, calcium, strontium, zinc and cadmium, X is at least one element selected from the group consisting of chlorine, bromine and iodine, A is at least one element selected from the group consisting of arsenic and silicon, and a, x, y and z satisfy $0.5 \leqq a \leqq 1.25$, $0 \leqq x \leqq 1$, $10^{-6} \leqq y \leqq 2\times10^{-1}$ and $0 \leqq z \leqq 10^{-2}$, respectively); and the like.

Moreover, examples of the stimulable phosphor include the phosphor described in Japanese Patent Application Laid-Open (JP-A) No. 58-69281, which is represented by the composition formula $M^{III}OX$:xCe (wherein $M^{III}$ is at least one trivalent metal element selected from the group consisting of Pr, Nd, Pm, Sm, Eu, Tb, Dy, Ho, Er, Tm, Yb and Bi, X is at least one element selected from the group consisting of Cl and Br, and x satisfies $0<x<0.1$); the phosphor described in Japanese Patent Application Laid-Open (JP-A) No. 58-206678, which is represented by the composition formula $Ba_{1-x}M_{x/2}L_{x/2}FX$:$yEu^{2+}$ (wherein M represents at least one alkali metal element selected from the group consisting of Li, Na, K, Rb and Cs, L represents at least one trivalent metal element selected from the group consisting of Sc, Y, La, Ce, Pr, Nd, Pm, Sm, Gd, Tb, Dy, Ho, Er, Tm, Yb, Lu, Al, Ga, In and Tl, X represent at least one halogen element selected from the group consisting of Cl, Br and I, and x and y satisfy $10^{-2} \leqq x 0.5$ and $0<y \leqq 0.1$, respectively); the phosphor described in Japanese Patent Application Laid-Open (JP-A) No. 59-27980, which is represented by the composition formula BaFX·xA:$yEu^{2+}$ (wherein X is at least one halogen element selected from the group consisting of Cl, Br and I, A is a burned product of a tetrafluoroboric acid compound, x satisfies $10^{-6} \leqq x \leqq 0.1$ and y satisfies $0<y \leqq 0.1$); the phosphors represented by $xM_3(PO_4)_2\cdot NX_2$:yA, $M_3(PO_4)_2$:yA, that is described in Japanese Patent Application Laid-Open (JP-A) No. 59-38278, $nReX_3\cdot mAX'_2$:xEu, $nReX_3\cdot mAX'_2$:xEu, ySm, $M^IX\cdot aM^{II}X'_2\cdot bM^{III}X''_3$:cA; and the like.

Additionally, examples of the stimulable phosphor include the phosphor described in Japanese Patent Application Laid-Open (JP-A) No. 59-47289, which is represented by the composition formula BaFX·xA:$yEu^2$+ (wherein X is at least one halogen element selected from the group consisting of Cl, Br and I, A is a burned product of at least one compound selected from the group consisting of hexafluoro compounds comprising a salt of a univalent or bivalent metal of hexafluorosilicic acid, hexafluorotitanic acid or hexafluorozirconium acid, and x and y satisfy $10^{-6} \leqq x \leqq 0.1$ and $0<y \leqq 0.1$, respectively); the phosphor described in Japanese Patent Application Laid-Open (JP-A) No. 59-56479, which is represented by the composition formula BaFX·xNaX':$aEu^2$+ (wherein X and X' are each independently at least one element selected from the group consisting of Cl, Br and I, and x and a satisfy $0<x \leqq 2$ and $0<a \leqq 0.2$, respectively); the phosphor described in Japanese Patent Application Laid-Open (JP-A) No. 59-56480, which is represented by the composition formula $M^{II}$ FX ·xNaX': $yEu^{2+}$:zA (wherein $M^{II}$ is at least one alkaline earth metal element selected from the group consisting of Ba, Sr and Ca, X and X' are each independently at least one halogen element selected from the group consisting of Cl, Br and I, A is at least one transition metal element selected from the group consisting of V, Cr, Mn, Fe, Co and Ni, and x, y and z satisfy $0<x \leqq 2$, $0<y \leqq 0.2$ and $0<z \leqq 10^{-2}$, respectively); and the like.

Further examples of the stimulable phosphor include the phosphor described in Japanese Patent Application Laid-Open (JP-A) No. 59-75200, which is represented by the composition formula $M^{II}FX \cdot aM^{I}X' \cdot bM'^{II}X''_2 \cdot cM^{III}X'''_3 \cdot xA:yEu^{2+}$ (wherein $M^{II}$ is at least one alkaline earth metal element selected from the group consisting of Ba, Sr and Ca, $M^{I}$ is at least one alkali metal element selected from the group consisting of Li, Na, K, Rb and Cs, $M^{II}$ is at least one bivalent metal element selected from Be and Mg, $M'^{III}$ is at least one trivalent metal element selected from the group consisting of Al, Ga, In and Tl, A is a metallic oxide, X is at least one halogen element selected from the group consisting of Cl, Br and I, X', X" and X'" are each independently at least one halogen element selected from the group consisting of F, Cl, Br and I, a satisfies $0 \leqq a \leqq 2$, b satisfies $0 \leqq b$ $10^{-2}$, c satisfies $0 \leqq c \leqq 10^{-2}$, a, b and c satisfy $a+b+c \leqq 10^{-6}$, x satisfies $0 < \times 0.5$ and y satisfies $0 < y \leqq 0.2$); the stimulable phosphor described in Japanese Patent Application Laid-Open (JP-A) No. 60–84381, which is represented by the composition formula $M^{II} X_2 \cdot aMIIX'_2:xEu^{2+}$ (wherein MII is at least one alkaline earth metal element selected from the group consisting of Ba, Sr, and Ca, X and X' are each independently at least one halogen element selected from the group consisting of Cl, Br and I, X≠X', a satisfies $0.1 \leqq a \leqq 10.0$ and x satisfies $0 < \times \leqq 0.2$); and the like.

Other examples of the stimulable phosphor include the stimulable phosphor described in Japanese Patent Application Laid-Open (JP-A) No. 60-101173, which is represented by the composition formula $M^{II} FX \cdot aM^{I}X':xEu^{2}+$ (wherein $M^{II}$ is at least one alkaline earth metal element selected from the group consisting of Ba, Sr and Ca, $M^{I}$ is at least one alkali metal element selected from the group consisting of Rb and Cs, X is at least one halogen element selected from the group consisting of Cl, Br and I, X' is at least one halogen element selected from the group consisting of F, Cl, Br and I, a and x satisfy $0 \leqq a \leqq 4.0$ and $0 < \times \leqq 0.2$, respectively); the stimulable phosphor described in Japanese Patent Application Laid-Open (JP-A) No. 62-25189, which is represented by the composition formula $M^{I}X:xBi$ (wherein $M^{I}$ is at least one alkaline metal element selected from the group consisting of Rb and Cs, X is at least one halogen element selected from the group consisting of Cl, Br and I, and x satisfies $0 < \times \leqq 0.2$); and the like.

Of the stimulable phosphors described above, a phosphor of a dihydric europium activated alkali earth metal halogen compound system and a phosphor of a cerium activated rare earth oxyhalogen compound system are particularly preferable as they exhibit a stimulated emission property of high luminance.

Even so, the stimulable phosphors used in the present invention are not limited to the above-described phosphors, and any phosphor may be used as long as it exhibits stimulated emission when excitation light is irradiated after irradiation of the radiation.

As the binder contained in the stimulable phosphor-containing coating solution, a thermoplastic elastomer that has elasticity at ordinary temperature and exhibits fluidity when heated is preferably used.

Examples of the thermoplastic elastomer include polystyrene, polyolefin, polyurethane, polyester, polyamide, polybutadiene, ethylene vinyl acetate, polyvinyl chloride, natural rubber, fluororubber, polyisoprene, chlorinated polyethylene, styrene-butadiene rubber, silicon rubber and the like.

Of the thermoplastic elastomers, a thermoplastic elastomer having a softening temperature or a melting point of from 30 to 300° C. is generally used, a thermoplastic elastomer with a range of from 30 to 200° C. is preferably used and one with a range of from 30 to 150° C. is particularly preferably used.

The stimulable phosphor-containing coating solution is prepared by sufficiently mixing the stimulable phosphor and the binder in a solvent, and dispersing the stimulable phosphor uniformly by use of a propeller mixer, a dissolver or the like.

Examples of the organic solvent include lower alcohols such as methanol, ethanol, n-propanol, n-butanol, and the like; chlorine-atom-containing hydrocarbons such as methylene chloride, ethylene chloride, and the like; ketones such as acetone, methyl ethyl ketone, methyl isobutyl ketone, and the like; esters comprising a lower fatty acid and a lower alcohol such as methyl acetate, ethyl acetate, butyl acetate, and the like; ethers such as dioxane, ethylene glycol monoethyl ether, ethylene glycol monomethyl ether, and the like; and the like. The above organic solvents may be used alone, or a mixture of two or more types may be used. An arbitrary amount of the organic solvent is used such that a stimulable phosphor-containing coating of a predetermined viscosity solution is prepared.

Further, although the mixing ratio of the binder and the stimulable phosphor in the stimulable phosphor-containing coating solution varies depending on the intended properties of the radiation image conversion panel, the type of stimulable phosphor, and the like, in general, it is preferable that the mixing ratio is a weight ratio of from 1:1 to 1:100, and a ratio of from 1:8 to 1:40 is particularly preferable.

In the above mixing ratio, when the amount of the stimulable phosphor used per one part by weight of the binder is less than one part by weight, the sensitivity of the stimulable phosphor may be lowered. On the other hand, when the amount of the stimulable phosphor used per one part by weight of the binder is more than 100 parts by weight, the durability of the radiation image conversion panel may not be sufficient as the strength of the stimulable phosphor layer is low.

Further, to the stimulable phosphor-containing coating solution, if desired, any of various types of additives can be added such as a dispersing agent for improving the dispersibility of the stimulable phosphor, a plasticizer for improving the bonding strength between the binder and the stimulable phosphor in the stimulable phosphor layer after the stimulable phosphor layer is formed, and the like.

Examples of the dispersing agent include phthalic acid, stearic acid, caproic acid, lipophilic surface active agent and the like.

Examples of the plasticizer include phosphoric esters such as triphenyl phosphate, tricresyl phosphate, diphenyl phosphate, and the like; ester phthalates such as diethyl phthalate, dimethoxyethyl phthalate, and the like; glycolic acid esters such as glycolic acid ethyl phthalyl ethyl, glycolic acid butyl phthalyl butyl, and the like; polyesters made of polyethylene glycol and an aliphatic dibasic acid such as polyester made of triethylene glycol and adipic acid, polyester made of diethylene glycol and succinic acid; and the like; and the like.

Support

In the present invention, the radiation image conversion panel can be manufactured by applying, to a support, the stimulable phosphor-containing coating solution prepared by the method described above.

The material of the support can be selected arbitrarily from, for example, glass, metal plates, various materials used for supports of sensitivity-enhancing papers or sensitivity-enhancing screens in radiography, and known materials used for supports of radiation image conversion panels.

Specific examples of the main materials for the support include films of plastic substances such as cellulose acetate, polyester, polyethylene terephthalate, polyamide, polyimide, triacetate, polycarbonate, and the like, metal sheets such as aluminum foil, aluminum alloy foil, and the like, ordinary paper, baryta paper, resin coat paper, pigment paper containing pigments such as titanium dioxide, or the like, paper which is made by sizing polyvinyl alcohol or the like, plates or sheets of ceramic such as alumina, zirconia, magnesia, titania, or the like, and the like.

Further, the support may be used as a temporary support. When the support is used as a temporary support, the above-described known materials can be used for the temporary support.

Manufacturing of Radiation Image Conversion Panel

The radiation image conversion panel of the present invention can be manufactured in the following manner. The stimulable phosphor-containing coating solution 4 that is successively applied to the support 1 in FIG. 1 is dried suitably, and if desired, the support 1 on which the stimulable phosphor layer is provided is subjected to compressing processing under a temperature equal to or higher than the softening temperature or the melting point of the binder that exists in the stimulable phosphor layer.

The support 1 itself may be used as the support of the radiation image conversion panel, or the support 1 may be used as a temporary support such that, after the stimulable phosphor layer is formed, the formed stimulable phosphor layer is removed.

When the support 1 itself is used as the support of the radiation image conversion panel, the radiation image conversion panel of the present invention can be manufactured, for example, by drying the stimulable phosphor layer formed on the support, and thereafter, effecting compressing processing at a temperature equal to or higher than the softening temperature or the melting point of the binder that is contained in the stimulable phosphor layer.

Further, when the support 1 is used as a temporary support, the radiation image conversion panel of the present invention can be manufactured, for example, in the following manner. After drying the stimulable phosphor layer formed on the support, the stimulable phosphor layer is removed from the temporary support (support 1) so as to obtain a stimulable phosphor sheet. Subsequently, the obtained stimulable phosphor sheet is placed on a support that is readied separately. By effecting compressing processing on the stimulable phosphor sheet and the support at a temperature that is equal to or higher than the softening temperature or the melting point of the binder in the stimulable phosphor sheet, the stimulable phosphor sheet and the support are bonded, to thereby form the radiation image conversion panel of the present invention.

If desired, an adhesiveness imparting layer (undercoat layer) can be formed on the surface of the support for the purpose of improving the adhesive property between the support and the stimulable phosphor-containing coating solution, and a light reflecting layer or a light absorbing layer of titanium dioxide, alumina, gadolinium oxide or the like can be formed on the support for the purpose of improving the sensitivity and the image quality (sharpness and graininess) of the radiation image conversion panel.

Further, other layers can be formed that are selected suitably depending on the purpose, the intended use, and the like of the radiation image conversion panel.

By carrying out the compressing processing, it becomes possible to improve the adhesive property between the support, the stimulable phosphor layer and the layers that are formed as desired.

The compression apparatus used in the above compressing processing is not particularly limited, and a known apparatus, for example, a calender roll, a hot press or the like, can be used. For example, when a calender roll is used to carry out the compressing processing, the support on which the stimulable phosphor layer is formed is passed at fixed speed between rollers that are heated to a temperature equal to or higher than the softening temperature or the melting point of the binder contained in the formed stimulable phosphor layer.

Further, usually, the pressure during the compressing processing is generally 50 kgw/cm$^2$ or more. However, pressures of from 100 to 1,000 kgw/cm$^2$ are suitable in that they enable voids in the stimulable phosphor layer to be reduced.

As described above, according to the method of manufacturing a radiation image conversion panel of the present invention, even when a stimulable phosphor-containing coating solution having high viscosity is applied to the support at relatively low speed and in such a manner that the film thickness of the coated film is 100 $\mu$m or more, the film thickness of the coated film of the stimulable phosphor-containing coating solution is stable, the thickness of the stimulable phosphor layer in the same plane is uniform, no coating streaks are formed, there is no thickening of the layer at the end portions, and stable taking-up of the panel is possible. Further, as the produceability is high, a high quality radiation image conversion panel can be manufactured at low cost.

Radiation Image Conversion Panel

The radiation image conversion panel of the present invention is obtained by the method of manufacturing a radiation image conversion panel of the present invention, and is a radiation image conversion panel that comprises a stimulable phosphor layer with a uniform thickness, which has no coating streaks and has no thickening of the layer at the end portions and which can be taken up in a stable manner.

Further, the radiation image conversion panel of the present invention comprises the stimulable phosphor layer on the support, and comprises other layers selected suitably, if desired.

As described in Japanese Patent Application Laid-Open (JP-A) No. 59-200200, if desired, on the surface of the support (on the surface of the adhesiveness imparting layer, light reflecting layer or light absorbing layer if such a layer is provided on the surface of the support), minute indentations can be formed for the purpose of improving sharpness of images that are to be obtained.

As the other layers, for example, the following layers can be provided that are selected suitably depending on the respective purposes.

An undercoat layer can be provided on the surface of the support for the purpose of strengthening the bond between the support and the stimulable phosphor layer. Examples of the undercoat layer include an adhesiveness imparting layer comprised of a high molecular substance such as gelatin or the like.

Further, for the purpose of improving the sensitivity and the image quality (sensitivity, graininess) of the radiation image conversion panel, it is also possible to provide a light reflecting layer that is comprised of a light reflecting substance such as titanium dioxide or the like, a light absorbing layer that is comprised of a light absorbing substance such as carbon black or the like, or the like.

In addition, as described in Japanese Patent Application Publication (JP-B) No. 59-23400, a colored layer that absorbs the excitation light but does not absorb the stimulated emission light can also be provided on the surface of the support for the purpose of improving the sharpness of the image obtained by the radiation image conversion panel.

Moreover, when the support is used as a temporary support, if desired, a separable layer can be provided in advance on the surface of the temporary support for the purpose of making it easier to separate the formed stimulable phosphor sheet from the surface of the temporary support.

Additionally, a transparent protective layer can also be provided on the surface of the stimulable phosphor layer for the purpose of protecting the stimulable phosphor layer physically and chemically.

The transparent protective layer can be formed by a method in which a solution that is prepared by dissolving a transparent high molecular substance in a suitable solvent is applied to the surface of the stimulable phosphor layer. Examples of the transparent high molecular substance include cellulose derivatives such as cellulose acetate, nitrocellulose, and the like, synthetic high molecular substances such as polymethylmethacrylate, polyvinyl butyral, polyvinyl formal, polycarbonate, polyvinyl acetate, vinyl chloride·vinyl acetate copolymer and the like, and the like.

Further, the transparent protective layer can also be formed by a method in which a protective layer forming sheet such as a transparent glass plate or a plastic sheet formed of polyethylene terephthalate, polyethylene naphthalate, polyethylene, polyvinylidene chloride, polyamide or the like, is formed separately and bonded on the surface of the stimulable phosphor layer by using a suitable adhesive.

It should be noted that generally, the preferable thickness of the transparent protective layer is from 0.1 to 20 μm. If the film thickness of the transparent protective layer is less than 0.1 μm, durability of the transparent protective layer may not be sufficient. On the other hand, if the thickness of the transparent protective layer is more than 20 μm, there may often be instances of blurriness in the images obtained by the radiation image conversion panel.

As described above, the radiation image conversion panel of the present invention is obtained by the method of manufacturing a radiation image conversion panel of the present invention. As the layer thickness of the radiation image conversion panel is uniform, uniform stimulated emission due to uniform energy absorption and uniform irradiation of excitation light can be obtained.

EXAMPLES

Examples of the present invention will be described hereinafter. However, the present invention is not to be limited by the following Examples.

Example 1

Preparation of Stimulable Phosphor-Containing Coating Solution (1) To 50 g of a methyl ethyl ketone organic solvent was added 100 g of $BaFBr_{0.9}I_{0.1}:Eu^{2+}$ serving as a stimulable phosphor. The solution was dispersed by an ultrasonic dispersion apparatus for 60 minutes, and thereafter, classified. Then, the resulting product was dried at 150° C. under reduced pressure.

(2) The following compositions were added to the methyl ethyl ketone organic solvent, and the resultant mixture was then dispersed by a propeller mixer (whose rotational frequency was 3,000 rpm) to prepare a stimulable phosphor-containing coating solution that had a viscosity of 3.0 Pa·s at 25° C.

The stimulable phosphor obtained in (1) 100 g
Polyurethane (binder) 24.0 g
(15% MEK solution of PANDEX T5265 (trade name) manufactured by Dainippon Ink & Chemicals, Inc.)
Bisphenol A type epozy resin 1.0 g
(yellowing prevention agent)
(trade name: EPICOAT 1004, manufactured by Yuka Shell Epoxy Co., Ltd.)
Polyisocyanate (hardener) 4.0 g
(trade name: CORONATE HX, manufactured by Nippon Polyurethane Co., Ltd.)

Preparation of Stimulable Phosphor Sheet

A silicon-based parting agent (trade name: KS701, manufactured by Shinshu Silicon Co., Ltd.) was applied to the surface of a polyethylene terephthalate sheet (whose thickness was 180 μm) used as a temporary support. In accordance with the method of manufacturing a radiation image conversion panel of the present invention (the mode of application shown in FIG. 1), the prepared stimulable phosphor-containing coating solution is applied continuously to the surface of the polyethylene terephthalate (coating width: 1,000 mm, coating length: 1,000 m), and thereafter, is dried to form a stimulable phosphor layer on the surface of the polyethylene terephthalate support.

The speed at which the polyethylene terephthalate support (temporary support) was moved while the stimulable phosphor-containing coating solution was being applied was 5 m/min, the gap A between the tip discharge opening of the extrusion coater (manufactured by Fuji Photo Film Co., Ltd.) and the support was 600 μm, the film thickness B of the coated film of the stimulable phosphor-containing coating solution was 500 μm, the angle formed by, on the one hand, the direction of the shortest distance between the tip discharge opening of the extrusion coater and the roller and, on the other hand, the plane located parallel to the plane of the surface on which the extrusion coater was disposed was 5°, and the angle formed by the direction in which the stimulable phosphor-containing coating solution was discharged and the plane located parallel to the plane of the surface on which the extrusion coater was disposed was 40°.

Then, the formed stimulable phosphor layer was peeled from the surface of the polyethylene terephthalate (temporary support), to prepare a stimulable phosphor sheet (Sample a-1). At this time, the temperature of the stimulable phosphor-containing coating solution and the extrusion coater was kept at approximately 16° C. by well water.

Preparation of Light Reflecting Layer-Forming Coating Solution

To a methyl ethyl ketone organic solvent, a compound of the following compositions was added, and the resultant mixture was then dispersed by using a propeller mixer at a rotational frequency of 3,000 rpm to prepare a light reflecting layer-forming coating solution having a viscosity of from 25 to 30 Pa·s at 25° C.

| | |
|---|---|
| BaFBr<br>(90% of which is particles whose particle diameter is in the range of from 1 to 5 μm) | 214 g |
| Soft acrylic resin (as a solid component) | 25.7 g |
| Epoxy resin | 10.7 g |
| Nitrocellulose<br>(nitrification ratio: 11.5%, solid component 10% by weight) | 64 g |

Preparation of Undercoat Layer-Forming Coating Solution

To a methyl ethyl ketone solvent, 90 g of a soft acrylic resin (a solid component) and 50 g of nitrocellulose were added, and were then dispersed and mixed-in by using a propeller mixer at a rotational frequency of 3,000 rpm, to prepare an undercoat layer-forming coating solution having a viscosity of from 3 to 6 Pa·s at 25° C.

Preparation of Radiation Image Conversion Panel

A polyethylene terephthalate sheet (whose thickness was 300 μm) was used as a support, and the prepared undercoat layer-forming coating solution was housed in the stimulable phosphor-containing coating solution housing portion 3*a* shown in FIG. 1. In the same manner of applying the stimulable phosphor-containing coating solution as described above, the prepared undercoat layer-forming coating solution was continuously applied to the surface of the polyethylene terephthalate (support) (thickness of the coated film: 15 μm). Then, the temperature was raised in stages from 60 to 120° C. so as to dry the coated film of the undercoat layer-forming coating solution, to form an undercoat layer on the surface of the polyethylene terephthalate support.

Next, in the same manner as that described above, the prepared light reflecting layer-forming coating solution was continuously applied (thickness of the coated film: 60 μm) to the formed undercoat layer, and similarly, the temperature was raised gradually from 60 to 120° C. so as to dry the coated film of the light reflecting layer-forming coating solution, to form a light reflecting layer on the undercoat layer formed above.

Further, the stimulable phosphor sheet (Sample a-1) was placed on the light reflecting layer formed above, and compressing processing was carried out. The compressing processing was carried out continuously under a pressure of 400 Kgw/$cm^2$ and at a temperature of 80° C. by utilizing a calender roll (manufactured by Sanyo Co., Ltd.). Due to the above compressing processing, the stimulable phosphor sheet and the light reflecting layer on the support were fused completely, to form a stimulable phosphor layer on the formed light reflecting layer.

After the compressing processing, a transparent film (thickness: 10 μm) of polyethylene terephthalate, which was coated with a polyester adhesive (trade name: BYRON 300), was bonded to the surface of the stimulable phosphor sheet formed above, to form a transparent protective layer.

In this way, a radiation image conversion panel (Sample A-1) was prepared in which the undercoat layer, the light reflecting layer, the stimulable phosphor layer and the transparent protective layer were formed sequentially on the support.

Example 2

A stimulable phosphor sheet (Sample a-2) and a radiation image conversion panel (Sample A-2) were prepared under the same conditions as those of Example 1, except that the speed at which the support (and the temporary support) were moved was changed to 0.5 m/min, the film thickness B (μm) of the coated film of the stimulable phosphor-containing coating solution was set arbitrarily in the range of 100 (μm)$\leqq$B$\leqq$1,000 (μm), and the gap A (μm) between the tip discharge opening of the extrusion coater and the support was set arbitrarily in the range of 0<A$\leqq$1,400.

Figure 2:
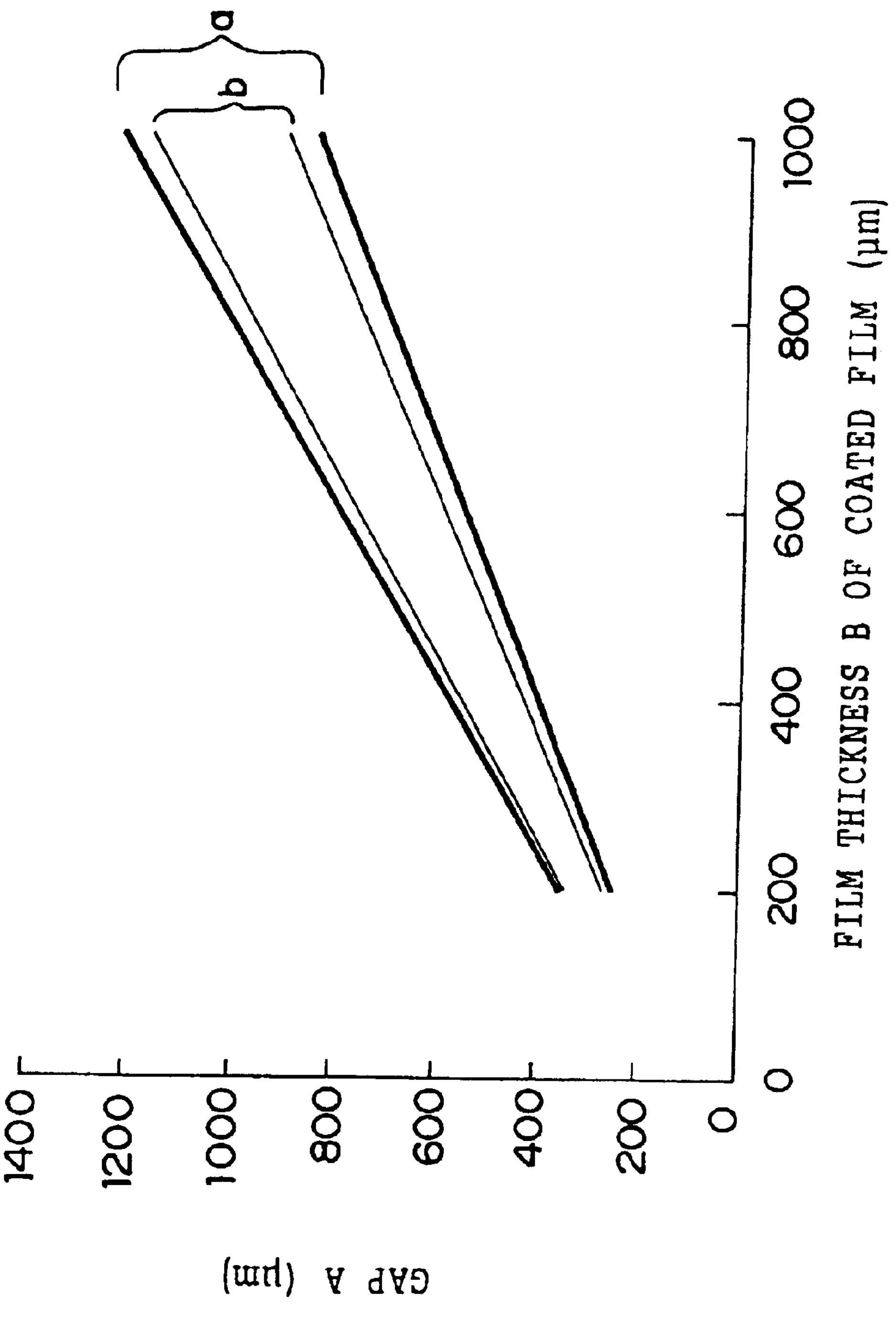
FIG. 2 is a graph that shows the relationship between a gap A (μm) between a tip of a coater and a support or a temporary support, and a coating solution thickness B (μm) in a coating method according to the present invention.

The samples that were prepared under the condition that the values of A and B were in a region a sandwiched between the thick lines in FIG. 2 (Sample a-2 and Sample A-2) had a more uniform film thickness compared with samples prepared under the condition that the values of A and B were outside of the region a. Accordingly, it can be said that if the values of A and B are set in the region a, a radiation image conversion panel of a more uniform film thickness can be prepared.

Moreover, the samples that were prepared under the condition that the values of A and B were in a region b sandwiched between the fine lines in FIG. 2 (Sample a-2 and Sample A-2) had an extremely uniform film thickness compared with samples prepared under the condition that the values of A and B were outside of the region b. Accordingly, it can be said that by setting the values of A and B in the region b in particular, a radiation image conversion panel with an extremely uniform film thickness can be prepared.

Comparative Example 3

A stimulable phosphor sheet (Sample a-3) was prepared followed by preparation of a radiation image conversion panel (Sample A-3) under the same conditions as those of Example 1, except that the speed at which the support was moved was changed to 10 m/min, the film thickness B (μm) of the coated film of the stimulable phosphor-containing coating solution was set arbitrarily in the range of 100 (μm)$\leqq$B$\leqq$1,000 (μm) and the gap A (μm) between the tip discharge opening of the extrusion coater and the support was set arbitrarily in the range of 0<A$\leqq$1,400.

The samples that were prepared under the condition that the values of A and B were in the region a sandwiched between the thick lines in FIG. 2 (Sample a-3 and Sample A-3) had a more uniform film thickness compared with samples prepared under the condition that the values of A and B were outside of the region a. Accordingly, it can be said that if the values of A and B are set within the region a, a radiation image conversion panel with a more uniform film thickness can be prepared.

Moreover, the samples that were prepared under the condition that the values of A and B were in the region b sandwiched between the fine lines in FIG. 2 (Sample a-3 and Sample A-3) had an extremely uniform film thickness compared with samples prepared under the condition that the values of A and B were outside of the region b. Accordingly, it can be said that by setting the values of A and B in the region b in particular, a radiation image conversion panel with an extremely uniform film thickness can be prepared.

Comparative Example 1

By following the same procedures as in Example 1 except that a knife coater was used in place of the extrusion coater in Example 1, a stimulable phosphor sheet (Sample b-1) was prepared, followed by preparation of a radiation image conversion panel (Sample B-1).

Comparative Example 2

By following the same procedures as in Example 1 except that a knife coater was used in place of the extrusion coater in Example 1 and the speed at which the support was moved was changed to 0.5 m/min, a stimulable phosphor sheet (Sample b-2) was prepared, followed by preparation of a radiation image conversion panel (Sample B-2).

Comparative Example 3

By following the same procedures as in Example 1 except that a knife coater was used in place of the extrusion coater in Example 1 and the speed at which the support was moved was changed to 10 m/min, a stimulable phosphor sheet (Sample b-3) was prepared, followed by preparation of a radiation image conversion panel (Sample B-3).

Observation and Evaluation of Non-uniformity of Thickness (Occurrence of Coating Streaks) of Stimulable Phosphor Layers For the respective samples of the stimulable phosphor sheets prepared in the manner described above (Samples a-1 through a-3, and Samples b-1 through b-3), the thickness of the surfaces of the stimulable phosphor sheets were measured by a continuous thickness meter (manufactured by Anritsu Corp.). The evaluated (non-)uniformities of thickness are set forth in Table 1.

It should be noted that a stimulable phosphor layer having non-uniformity of thickness of 10 μm or less can generally be used with no problems in actual use.

Evaluation of Taking-Up Property of Stimulable Phosphor Sheets

Accumulation of coating at the end portions of the respective samples of the stimulable phosphor sheets prepared in the manner described above (Samples a-1 through a-3, and Samples b-1 through b-3) were observed visually, and the ease of taking-up the sheet was evaluated based on the following criteria.

The results are shown in Table 1.

○ . . . there is no accumulated coating at the end portions and stable taking-up can be carried out X . . . accumulation is observed at the end portions and it is difficult to take up the overall length Evaluation of Variation in Stimulated Emission Amounts of Radiation Image Conversion Panels The stimulated emission amounts of the radiation image conversion panels prepared in the manner described above (Samples A-1 through A-3, and Samples B-1 through B-3) were measured by an FCR 9000 (manufactured by Fuji Photo Film Co., Ltd.). The results are set forth in Table 1.

It should be noted that a radiation image conversion panel having a variation of the stimulated emission amounts of 3% or less compared to the average amount of the stimulated emission of the panel can generally be used with no problems in actual use.

manufacturing a radiation image conversion panel, even when a stimulable phosphor-containing coating solution is applied to a support at relatively low speed and in such a manner that the film thickness of the coated film of the stimulable phosphor-containing coating solution is 100 μm or more and the coated film of the stimulable phosphor-containing coating solution is wide and long, a method of a manufacturing a radiation image conversion panel, in which the stimulable phosphor layer is of a uniform thickness and has no coating streaks and the stimulable phosphor sheet has no accumulation of coating at the end portions, can be achieved.

Further, as the variation in of the stimulated emission amounts within the same plane of the radiation image conversion panel is 3% or less and thus is satisfactory, it is possible to obtain a radiation image conversion panel which has high quality and practical value and in which uniform stimulated emission due to uniform energy absorption and uniform radiation of excitation light is possible.

On the other hand, in Comparative Examples 1 through 3 that did not use the extrusion coater, a uniform stimulable phosphor layer was not able to be formed due to the generation of coating streaks during application, and the entire length of the support was not able to be taken up due to the increased film thickness at the end portions in the transverse direction. Particularly, in Comparative Example 3, as the solution did not entirely spread on the support during coating, it was difficult to carry out stable application over the entire length of the support, although stable application over a short length was possible.

According to the present invention, even when a highly viscous stimulable phosphor-containing coating solution, which contains a high concentration of a stimulable phosphor as a solid component, is applied such that the film thickness is 100 μm or more, a method of manufacturing a radiation image conversion panel that has high produceablity and that can coat a support with a uniform film thickness can be obtained.

Further, a radiation image conversion panel, which can be preferably used for medical radiography and the like and which is of a uniform film thickness and of high quality and high practical value, can be presented at a low cost.

What is claimed is:

1. A method of manufacturing a radiation image conversion panel in which a stimulable phosphor-containing coat-

TABLE 1

| | Coater | Moving Speed [m/min] | Viscosity [pa · s] | Gap A [μm] | Coating Thickness B [μm] | Angle θ | Angle α | Coating Non-Uniformity (Difference in Thickness of thickest and thinnest portions) μm | Variation in Stimulated Emission Amounts [%] | Taking-up Property |
|---|---|---|---|---|---|---|---|---|---|---|
| Example 1 | Extrusion Coater | 5 | 3.0 | 600 | 500 | 5 | 40 | 7 | 2 | ○ |
| Example 2 | Extrusion Coater | 0.5 | 3.0 | * | * | 5 | 40 | 5 | 1.5 | ○ |
| Example 3 | Extrusion Coater | 10 | 3.0 | * | * | 5 | 40 | 9 | 2.5 | ○ |
| Comparative Example 1 | Knife Coater | 5 | 3.0 | 1,000 | 500 | — | — | 18 | 5.6 | x |
| Comparative Example 2 | Knife Coater | 0.5 | 3.0 | 1,000 | 500 | — | — | 14 | 4.3 | x |
| Comparative Example 3 | Knife Coater | 10 | 3.0 | 1,000 | 500 | — | — | 22 | 7.5 | x |

The viscosities were measured by a VISCONIC ELD. R and VISCOMETER CONTROLLER E-200 ROTER No. 71 (both manufactured by Tokyo Keiki Co., Ltd.) at a rotational frequency of 20 rpm at 25° C.
*combinations arbitrarily selected from the ranges of $0 < A \leq 1{,}400$ and $100 \leq B \leq 1{,}000$ When Examples 1 through 3 are compared with Comparative Examples 1 through 3 on the basis of the data in Table 1, it can be understood that, according to the method of manufacturing a radiation image conversion panel of the present invention in which an extrusion coater is used for ing solution, which contains at least a stimulable phosphor and a binder, is applied to a support by use of an extrusion coater such that the film thickness of a coated film of this stimulable phosphor-containing coating solution is in the range of from 300 to 800 μm, wherein the stimulable phosphor-containing coating solution is applied such that a gap A (μm) between a discharge opening at the tip of the extrusion coater and the support, and the film thickness B (μm) of the coated film of the stimulable phosphor-containing coating solution satisfy the following relational expression $$0.75 \times B + 100 \leqq A \leqq 1.10 \times B + 130.$$

2. A method of manufacturing a radiation image conversion panel according to claim 1, wherein at least one of the support and the extrusion coater is moved, and the speed of the movement is from 0.5 to 50 m/min.

3. A method of manufacturing a radiation image conversion panel according to claim 2, wherein the viscosity of the stimulable phosphor-containing coating solution is from 1 to 10 Pa·s.

4. A method of manufacturing a radiation image conversion panel according to claim 1, wherein the viscosity of the stimulable phosphor-containing coating solution is from 1 to 10 Pa·s.

5. A method of manufacturing a radiation image conversion plane according to claim 1, wherein a speed of movement of the support is in the range of from 0.5 to 5 m/min.

6. A method of manufacturing radiation image conversion panel in which a stimulable phosphor-containing coating solution, which contains at least a stimulable phosphor and a binder, is applied to a support by use of an extrusion coater such that the film thickness of a coated film of the stimulable phosphor-containing coating solution is 100 μm or more, wherein the stimulable phosphor-containing coating solution is applied such that a gap A (μm) between a discharge opening at the tip of the extrusion coater and the support, and the film thickness B (μm) of the coated film of this stimulable phosphor-containing coating solution satisfy the following relational expression $$0.80 \times B + 110 \leqq A \leqq 1.05 \times B + 130.$$

7. A method of manufacturing a radiation image conversion panel in which a stimulable phosphor-containing coating solution, which contains at least a stimulable phosphor and a binder, is applied to a support by use of an extrusion coater such that the film thickness of a coated film of the stimulable phosphor-containing coating solution is 100 μm or more, wherein the stimulable phosphor-containing coating solution is applied such that a gap A (μm) between a discharge opening at the tip of the extrusion coater and the support, and the film thickness B (μm) of the coated film of the stimulable phosphor-containing coating solution satisfy the following relational expression $$0.75 \times B + 100 \leqq A \leqq 1.10 \times B + 130.$$

8. A method of manufacturing a radiation image conversion panel in which a stimulable phosphor-containing coating solution, which contains at least a stimulable phosphor and a binder, is applied to a support by use of an extrusion coater such that the film thickness of a coated film of the stimulable phosphor-containing coating solution is in the range of from 300 to 800 μm, wherein the stimulable phosphor-containing coating solution is applied such that a gap A (μm) between a discharge opening at the tip of the extrusion coater and the support, and the film thickness B (μm) of the coated film of the stimulable phosphor-containing coating solution satisfy the following relational expression $$0.80 \times B + 110 \leqq A \leqq 1.05 \times B + 130.$$

9. A radiation image conversion panel obtained by the method of manufacturing a radiation image conversion panel in which a stimulable phosphor-containing coating solution, which contains at least a stimulable phosphor and a binder, is applied to a support by use of an extrusion coater such that the film thickness of a coated film of the stimulable phosphor-containing coating solution is in the range of from 300 to 800 μm, wherein the stimulable phosphor-containing coating solution is applied such that a gap A (μm) between a discharge opening at the tip of the extrusion coater and the support, and the film thickness B (μm) of the coated film of the stimulable phosphor-containing coating solution satisfy the following relational expression $$0.75 \times B + 100 \leqq A \leqq 1.10 \times B + 130.$$

10. A radiation image conversion panel according to claim 9, wherein a speed of movement of the support is in the range of from 0.5 to 5 m/min.

* * * * *